United States Patent
Hums

[11] Patent Number: 5,971,752
[45] Date of Patent: Oct. 26, 1999

[54] SINTERING PLANT

[75] Inventor: Erich Hums, Hessdorf, Germany

[73] Assignee: Siemens Aktiengesellschaft, Munich, Germany

[21] Appl. No.: 09/122,053

[22] Filed: Jul. 24, 1998

[30] Foreign Application Priority Data

Jul. 24, 1997 [EP] European Pat. Off. .............. 97112725

[51] Int. Cl.⁶ ........................................................ F23J 3/00
[52] U.S. Cl. .......................... 432/128; 266/156; 432/152; 110/216
[58] Field of Search ................................ 110/216, 165 A, 110/165 R, 168; 266/144, 148, 156; 432/90, 128, 152, 91, 13

[56] References Cited

U.S. PATENT DOCUMENTS

| | | | |
|---|---|---|---|
| 4,371,150 | 2/1983 | Tsukuda | 432/91 |
| 4,753,181 | 6/1988 | Sosnowski | 110/346 |
| 5,574,746 | 11/1996 | Ammon et al. | 373/9 |
| 5,769,009 | 6/1998 | Saitoh | 110/165 R |

FOREIGN PATENT DOCUMENTS

| | | |
|---|---|---|
| 0 559 071 A2 | 9/1993 | European Pat. Off. . |
| 2 310 794 | 12/1976 | France . |
| 41 05 510 C1 | 5/1992 | Germany . |
| 60-39130 | 2/1985 | Japan . |

OTHER PUBLICATIONS

Abstract of Soviet Application No. 89–091991 (Krylenko), dated Sep. 15, 1988.
International Publication No. 95/27802 (Brüggendick), dated Oct. 19, 1995.
"Reduction of PCDD/PCDF–emissions in an iron/ore sintering plant" (Weiss), VDI Reports, No. 1298, 1996, pp. 269–285.
"Reduction techniques for gas purification for PCDD/PCDF" (Mayer–Schwinning), VDI Reports, No. 1298, 1996, pp. 191–211.
Abstract of Soviet Application No. 88–062219 (Arist et al.), dated Jul. 15, 1987.

Primary Examiner—Teresa Walberg
Assistant Examiner—Gregory A. Wilson
Attorney, Agent, or Firm—Herbert L. Lerner; Laurence A. Greenberg

[57] ABSTRACT

A sintering plant includes an apparatus for transporting sinter material along a sintering section through at least one first zone in which the sinter material heats to a low temperature, and through a second zone in which the sinter material heats to a high temperature. Discharge lines are provided along the sintering section. A dioxin catalytic converter for exhaust gas is provided in the discharge lines disposed along the second zone or directly downstream thereof. In this manner, catalytic breakdown of dioxins can be achieved even in the exhaust gas of a sintering plant, which has not been possible heretofore.

10 Claims, 2 Drawing Sheets

SINTERING PLANT

BACKGROUND OF THE INVENTION

Field of the Invention

The invention relates to a sintering plant having measures for decreasing dioxins in exhaust gas.

A sintering plant is a large-scale plant in the metallurgical industry and serves for agglomerating finely particulate or fine-dust metal, metal oxide or metal sulfide solid mixtures. The agglomerated solid mixtures can then be used in a blast furnace.

The material to be sintered, which is also referred to as sinter material, is solidified in the sintering plant by sintering, i.e. by heating to a point close to the melting point with surface softening and partial melt and slag formation. For that purpose, the sinter material is put onto a so-called traveling grate. In the case of ore smelting, the sinter material can be a fine ore, calcined pyrites, a blast furnace flue dust or a fine dust from a metal-processing industry, possibly together with returns, slag-forming addition or a solid fuel mixture, for example. The traveling grate in that plant is generally constructed as an endless chain from individual pallets to be filled. The chain runs over corresponding guide rolls in the working direction of the sintering plant. In that case, the filled upper track of the traveling grate or of the sintering belt runs over a suction box or forced-draft box, in which reduced pressure or overpressure is respectively generated by a suction or forced-draft fan, so that combustion air is respectively sucked or forced through the filled pallets. Sintering plants are currently known having grate widths up to 5 m and suction lengths up to 150 m.

At an inlet location, the pallets passing by are first charged with previously roasted returns to protect the grate bars and are then charged with the sinter material, which is possibly mixed with fuel. The charged pallets then pass by an ignition furnace, so that the sinter material or the fuel present therein is ignited by an ignition flame. The combustion and sintering process in the individual pallets then continues in a self-supporting manner because of self-sustaining combustion due to the air passed through by the suction or forced-draft fan, while the pallets are transported to an outlet location through the use of the sintering belt.

In order to conduct the exhaust gas or the combustion gas, a number of discharge lines are disposed along the upper track of the sintering belt in the sintering plant. The exhaust gas of the discharge lines transported by the suction or forced-draft fan through the individual pallets is collected in a collective exhaust gas line and finally passes through a stack into the environment. In order to recover fine dusts and to protect a downstream suction fan, an electrostatic precipitator is usually integrated into the exhaust gas line. The dusts produced from the electrostatic precipitator can be recirculated again to the sintering plant.

A majority of the sinter material processed in the sintering plant is finely particulate and fine-dust abraded material from filing, grinding or drilling processes of the metal-processing industry. However, that abraded material is frequently disadvantageously mixed with oily cutting aids, lubricants or coolants, which have halogenated hydrocarbons and aromatics to a not inconsiderable extent. Therefore, in the thermal processes during the sintering operation, the sintering plant also forms dioxins, which can pass into the environment through the exhaust gas. Sintering plants therefore represent the largest source for the emission of dioxins as compared with other large-scale plants of the metal production and metal-processing industry. Thus, in the exhaust gas of a sintering plant, dioxin values up to 60 ng TE/m$^3$ have been found downstream of the electrostatic precipitator (TE=toxic equivalents). The term "dioxins" is used in this context as a collective term for the group of cyclic halogenated aromatic polyethers. They include, in particular, the cyclic ethers (furans) and the cyclic diethers (the actual dioxins). Particularly toxic representatives of the two groups which may be mentioned in this case are polychlorinated dibenzodioxins (PCDD) and polychlorinated dibenzofurans (PCDF).

In order to keep the level of dioxins released by a sintering plant into the environment below the legally prescribed limit value (currently 0.1 ng TE/m$^3$), an article by W. Weiss, entitled: "Minderung der PCDD/PCDF-Emissionen an einer Eisenerzsinteranlage" [Reducing the PCDD/PCDF Emissions from an Iron Ore Sintering Plant], in VDI Berichte No. 1298 (1996), pages 249 ff., has disclosed adding a mixture of calcium hydroxide, $Ca(OH)_2$ and carbon (in the form of blast furnace coke or activated carbon) as an admixture to the exhaust gas of a sintering plant. That is done to adsorb the dioxins and to withdraw the partially dioxin-laden admixture from the exhaust gas again using a cloth filter and recirculating it back to the exhaust gas. In addition, an article by G. Mayer-Schwinning et al., entitled: "Minderungstechniken zur Abgasreinigung für PCDD/F" [Techniques for Decreasing PCDD/F in Flue Gas Emission Control], in VDI Berichte No. 1298 (1996), pages 191 ff., discloses using zeolites as a dioxin adsorber in the exhaust gas of a sintering plant.

On one hand, in comparison with the adsorption technique, a substantially more effective catalytic breakdown of the dioxins in the exhaust gas of a sintering plant through the use of a suitable dioxin catalyst, due to the low exhaust gas temperatures of below 200° C., is only possible with an expensive heating of the exhaust gas. Laden dioxin adsorbers, on the other hand, have to be ultimately disposed of in a landfill, which in turn gives rise to considerable costs and in addition represents a hazard to the environment.

SUMMARY OF THE INVENTION

It is accordingly an object of the invention to provide a sintering plant, which overcomes the hereinafore-mentioned disadvantages of the heretofore-known devices of this general type and which uses a particularly effective and inexpensive way of decreasing dioxins in exhaust gas.

With the foregoing and other objects in view there is provided, in accordance with the invention, a sintering plant, comprising an inlet location and an outlet location for sinter material; a sintering section between the inlet and outlet locations defining at least one first zone in which the sinter material heats to a low temperature and a second zone in which the sinter material heats to a high temperature; an apparatus for transporting the sinter material along the sintering section through the at least one first zone and the second zone; a number of discharge lines for exhaust gas disposed along the sintering section; and a dioxin catalytic converter disposed in at least one of the discharge lines along the second zone or immediately downstream of at least one of the discharge lines of the second zone, for decreasing dioxins in the exhaust gas.

The invention thus starts out in a first step from the consideration that the low temperatures of the sintering plant exhaust gas, which make catalytic breakdown of the dioxins impossible, are due to collecting the exhaust gas from all of the discharge lines disposed along the sintering section, in one collective exhaust gas line. In that case, cool exhaust gases from the front region of the sintering section, in which combustion only takes place on the surface of the sinter material present in the pallet, are mixed with hot exhaust gases from the rear region of the sintering section, in which the combustion has included the entire sinter material. Due to this mixing, the exhaust gas temperature in the exhaust gas line remains constantly below 200° C. However, the exhaust gas temperature in the individual discharge lines can itself be substantially higher, depending on the combustion process taking place at the location of the discharge line.

In a second step, it is recognized that the sinter material, after ignition, shows a typical temperature course along the sintering section corresponding to the advance in the combustion process. In this case, this temperature course includes at least one first zone, in which the sinter material heats to a low temperature due to the advance of the combustion process from the surface to the interior of the sinter material, and a second zone in which the sinter material heats to a high temperature up to the combustion including all of the sinter material and then cools again. The sinter material at the end of the sintering section can thus have a high temperature or else can already have cooled back to, or below, the low temperature of the first zone. In the latter case, a further "first zone" exists at the end of the sintering section.

Another basis which is used is the consideration that, in the temperature region of the first zone, i.e. usually in the front region of the sintering section, no significant amount of dioxins is formed. Therefore, no dioxins are present in the exhaust gas of the discharge lines along the first zone. In contrast, the greatest proportion of dioxins by far is produced along the second zone, i.e. usually along the rear region of the sintering section. This is due to the strongly temperature-dependent dioxin formation and destruction process and due to the high proportion of less-chlorinated furans occurring in sintering plants. In addition, the exhaust gas in the discharge lines along the second zone has a temperature which permits catalytic dioxin breakdown. This temperature is above 250° C.

Surprisingly, therefore, catalytic dioxin breakdown can be performed precisely in the partial exhaust gas of the sintering plant which is actually loaded with dioxins. The partial exhaust gas in which no catalytic breakdown may be carried out because of its low temperature, is also not laden with dioxins, or only to a very small extent. In addition, due to this realization, the dioxin catalyst only needs to be constructed for a partial exhaust gas stream, which is associated with cost savings.

Accordingly, the proven technology of catalytic dioxin removal may be used for the sintering plant exhaust gas, by separating the sintering plant exhaust gas into the essentially dioxin-free exhaust gas of the discharge lines along the first zone and the dioxin-laden exhaust gas in the discharge lines along the second zone. Catalytic dioxin removal is also a considerably more effective and less expensive solution than using so-called dioxin adsorbers. In addition, the high landfill costs for disposing of the laden dioxin adsorbers are avoided.

A suitable dioxin catalyst is a catalyst known per se based on titanium dioxide and tungsten trioxide having a vanadium pentoxide content between 1 and 25% by weight, with or without a further content of molybdenum trioxide. Dioxin catalysts of mixed oxides of the above-mentioned compounds are also possible. A dioxin catalytic converter can be present in honeycomb or plate form, with the catalytically active material being applied to a metallic or ceramic support. However, it is also possible to use the dioxin catalyst in the form of pellets or in the form of another packed bed.

In accordance with another feature of the invention, there are provided first and second exhaust gas lines, the discharge line or every discharge line along the first zone opening into the first exhaust gas line and the discharge line or every discharge line along the second zone opening into the second exhaust gas line. In this manner, the entire catalytic removal of dioxin can be performed by a single dioxin catalytic converter or dioxin catalyst module which is disposed in the second exhaust gas line. A dioxin catalyst module in this case is formed of a defined number of individual dioxin catalyst elements which are connected in parallel next to one another and one after the other. The defined number corresponds to the exhaust gas throughput rate.

Assignment of the discharge lines to the second or first zone depends on the actual temperature profile in the sinter material and thus, in particular, on the individual sintering plant. The second zone is specified in this case in such a manner that the exhaust gas in the discharge lines has a sufficiently high temperature and correspondingly catalytic dioxin breakdown can be performed. Catalytic dioxin breakdown is possible by using the catalysts presently known from temperatures of approximately 250° C.

In a conventional sintering plant for iron ore, the second zone essentially includes the rear third of the sintering section, as considered in the direction of transport of the sinter material. It is therefore possible in an iron ore sintering plant to allow the discharge lines along the rear third of the sintering section to open into the second exhaust gas line, to equip the second exhaust gas line with a dioxin catalytic converter and to release the thus cleaned up exhaust gas through a stack into the environment. The remaining exhaust gas lines open into a separate first exhaust gas line in which the exhaust gas is likewise fed to the stack and released into the environment. A special dioxin treatment of the exhaust gas in the first exhaust gas line is not necessary due to the low dioxin content.

In accordance with a further feature of the invention, when dealing with changing sinter material, the sintering system has a first and a second separate exhaust gas line, a number of discharge lines open through the use of a branch into the first and into the second exhaust gas lines, the branch includes a controllable apparatus for conducting the exhaust gas into the first or second exhaust gas line, and the dioxin catalytic converter is disposed in the second exhaust gas line. It is then possible, depending on the temperature of the exhaust gas or of the sinter material in the corresponding discharge line, to release the exhaust gas into the first exhaust gas line and then, without dioxin treatment, into the environment, or to conduct it into the second exhaust gas line, then to subject it to a dioxin treatment at a dioxin catalytic converter and only then to release it into the environment. This is done through the use of the controllable apparatus in the branch of the appropriate discharge lines. It is possible to achieve catalytic breakdown of dioxins in the exhaust gas with high flexibility through the use of a sintering plant of this type. This is carried out independently of the composition of the sinter material, and thus independently of the temperature profile in the sinter material along the sintering section, and in particular independently of the site of dioxin formation along the sintering section.

In accordance with an added feature of the invention, the controllable apparatus is a control valve. The exhaust gas in the corresponding discharge line can be conducted on occasion into the first exhaust gas line and on occasion into the second exhaust gas line by using control valve. In order to control the control valve, a temperature sensor, for example, can be provided. The sensor is disposed upstream of the branch in the corresponding discharge line or in the sinter material itself. The temperature of the exhaust gas or of the sinter material can be monitored by using such a temperature sensor. Accordingly, if the temperature falls below a preset value, the exhaust gas can be passed into the first exhaust gas line, and if the temperature exceeds a preset value, the exhaust gas can be passed into the second exhaust gas line having downstream dioxin removal. A possible preset value for the exhaust gas temperature is, for example, 200° C., and a possible preset value for the temperature in the interior of the sinter material is, for example, 600° C.

In accordance with an additional feature of the invention, the second exhaust gas line is brought together with the first exhaust gas line downstream of the dioxin catalytic converter in the direction of flow of the exhaust gas. In a structure of such a type, the required reduced pressure can be achieved in all of the discharge lines along the sintering section by using a single suction fan.

In accordance with a concomitant feature of the invention, there is provided an adsorber in the first exhaust gas line or in one or each discharge line along the first zone, for removing dioxins from the exhaust gas. This is done to avoid unforeseen dioxin emissions, although it has been found that the exhaust gas in the discharge line along the first zone is essentially dioxin-free.

An adsorber of this type is, for example, one having an adsorbent-coated cloth filter, which is disposed in the corresponding exhaust gas channel. A lime/activated carbon or a lime/blast furnace coke mixture is advantageously used as adsorber material.

Other features which are considered as characteristic for the invention are set forth in the appended claims.

Although the invention is illustrated and described herein as embodied in a sintering plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
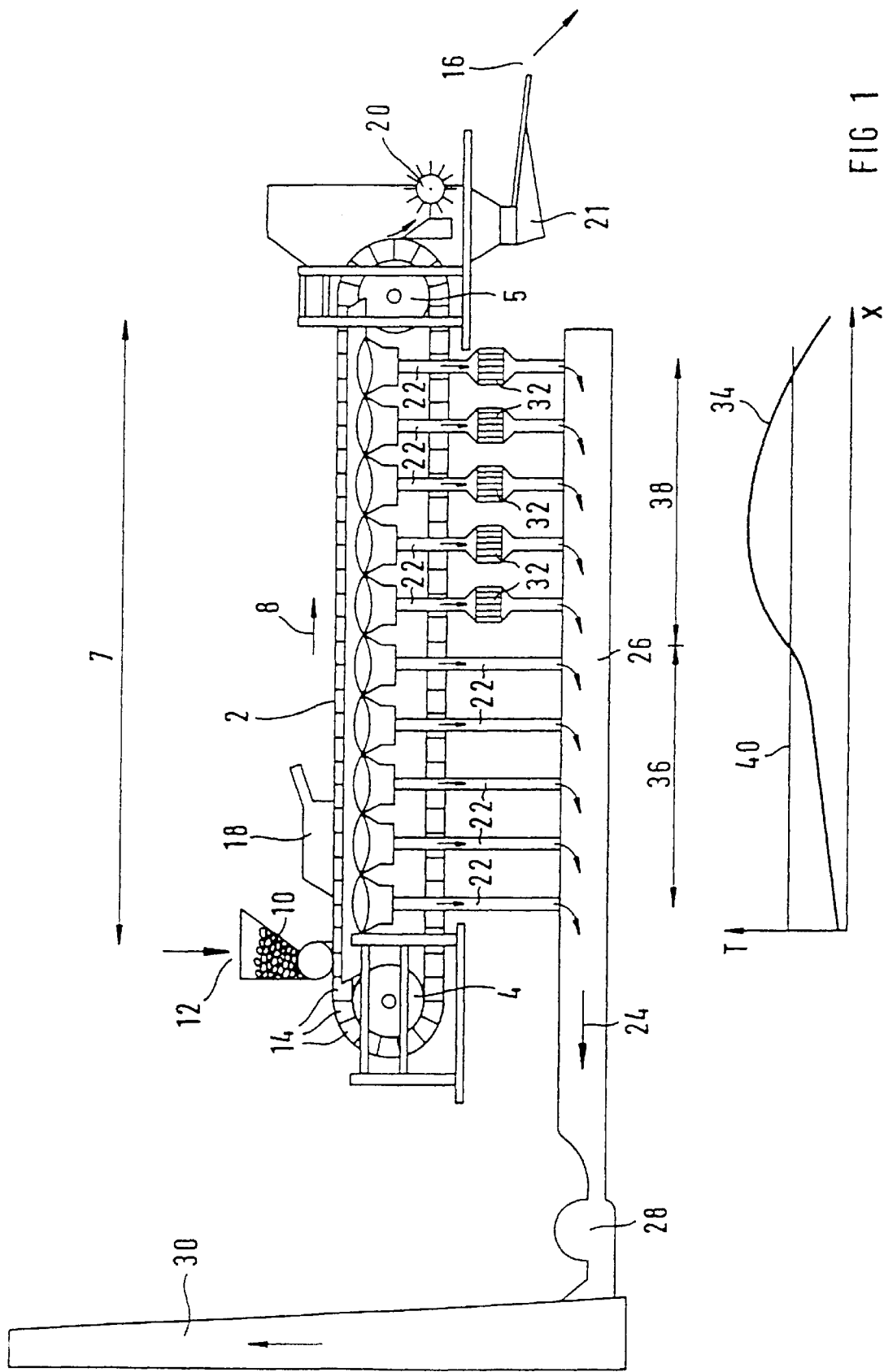
FIG. 1 is a diagrammatic, side-elevational view of a sintering plant having a dioxin catalytic converter built into discharge lines, and a collective exhaust gas line.

Referring now to the figures of the drawings in detail and first, particularly, to FIG. 1 thereof, there is seen a typical sintering plant for the metallurgical industry, as is used for agglomerating metallic fine dusts or fine metal ores. In this case, the sintering plant includes an endless sintering belt 2, which is conducted over two guide rolls 4, 5, as a transport apparatus. In this case, the sintering belt 2 transports a material to be sintered or sinter material 10 along a sintering section 7 in the direction of arrow 8. For this purpose, the sinter material 10 is charged at an inlet location 12 into each of a number of pallets 14 of the sintering belt 2 which pass by underneath. The sinter material 10 is taken off from the sintering plant at an outlet location 16 at the end of the process. Each individual pallet 14 has a bottom formed as a grating for air permeability.

A fuel such as coal or coke is added to the sinter material 10 to improve the combustibility and increase the effectivity of sintering. This is especially the case with oxide ores, whereas with sulfide ores, sulfur is already present as a fuel. The grating of the pallet 14 is also first covered with previously agglomerated returns of the sintering plant before introducing the actual sinter material 10.

The sinter material/fuel mixture in the pallet 14 passing by is ignited on the surface by an ignition flame at an ignition furnace 18. The combustion and sintering process proceeds by self-sustaining combustion in a self-supporting manner along the sintering section into the interior of the sinter material, through the use of introduced air. The sintered material is passed over a toothed-roll crusher 20 at the end of the sintering section 7, broken into manageable pieces, and finally taken off from the sintering plant through the outlet location 16. A fine dust collected by using a sieve 21 is recirculated back to the sintering plant through the inlet location 12.

A number of discharge lines 22 are provided along the sintering section 7 or along the sintering belt 2 for feeding combustion air into the pallets 14 running along the sintering section 7. Combustion gas or exhaust gas 24 flows through these discharge lines 22 into a collective exhaust gas line 26. A suction fan 28 is disposed in the exhaust gas line 26 to generate a required reduced pressure in the discharge lines 22. An outlet of this suction fan 28 opens into a stack 30, through which the exhaust gas 24 passes into the environment.

The discharge lines 22 disposed along the rear half of the sintering section 7 each have a titanium dioxide/tungsten trioxide-based dioxin catalytic converter 32 with a vanadium pentoxide admixture made of a ceramic support material in a honeycomb shape. The vanadium pentoxide content in this case is between 1 and 25%.

FIG. 1 likewise shows a typical temperature profile 34 of the sinter material along the sintering section 7 which occurs during the sintering of iron ore. It can readily be seen that the temperature T of the sinter material 10 rises to a low temperature below a threshold value 40 in a first zone 36 during the progress of the combustion and sintering process and finally exceeds the threshold value 40 along a second zone 38. The threshold value 40 is selected in this case at approximately 250° C. so that the exhaust gas in the discharge lines 22 has a temperature along the second zone 38 at which catalytic elimination of dioxins is possible. In the case shown, the discharge lines 22 along the second zone 38 are each provided with a dioxin catalytic converter 32, in accordance with the temperature profile 34. The exhaust gas of the discharge lines 22 along the first zone 36 essentially contains no dioxin and passes untreated into the exhaust gas line 26 and then through the stack 30 into the environment.

Figure 2:
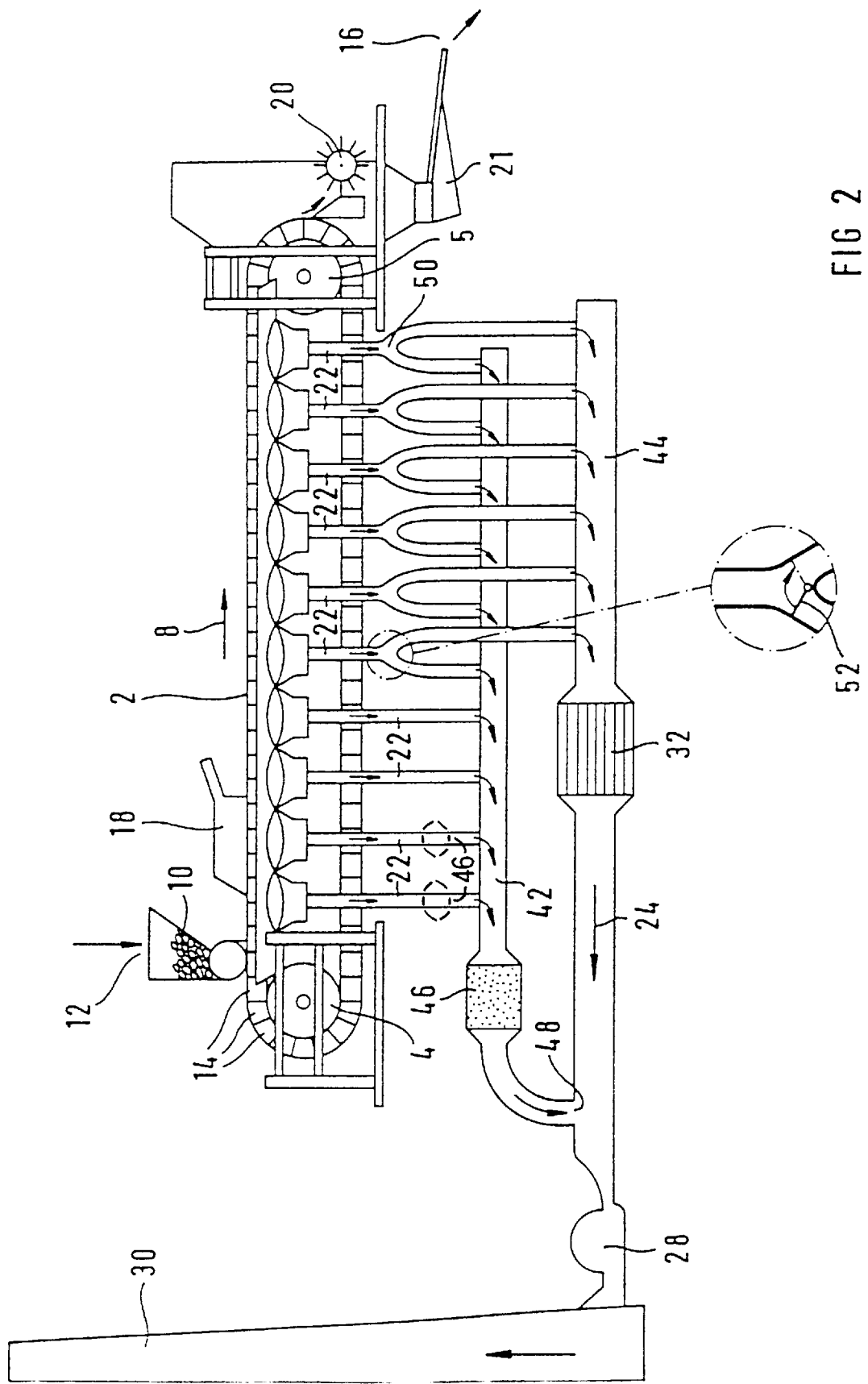
FIG. 2 is a diagrammatic, side-elevational view a sintering plant having a first and a second exhaust gas line with a dioxin adsorber or a dioxin catalytic converter and a number of discharge lines opening into the first and second exhaust gas lines.

A sintering plant having first and second exhaust gas lines 42 and 44 is shown as a further exemplary embodiment of the invention in FIG. 2. The first exhaust gas line 42 is provided with a dioxin adsorber 46. Instead, the discharge lines 22 may have dioxin adsorbers 46', although only one is shown in broken lines. The second exhaust gas line 44 is provided with a dioxin catalytic converter 32. In this case, the first exhaust gas line 42 leads into the second exhaust gas line 44 through an outlet or mouth 48 downstream of the dioxin catalytic converter 32, in the direction of flow of the exhaust gas 24.

A number of discharge lines 22 each lead through a branch 50 into the first exhaust gas line 42 and the second exhaust gas line 44. In this case, each branch 50 includes a control valve 52, with which it is possible to steer or control conduction of the exhaust gas 24 either into the first exhaust gas line 42 or into the second exhaust gas line 44. The control of the control valve 52 is dependent in this case on the temperature of the exhaust gas 24 in the individual discharge line 22. The temperature is recorded in this case through the use of a non-illustrated temperature sensor, which is in the individual discharge line 22. If the temperature of the exhaust gas 24 exceeds an appropriate preset value, the exhaust gas 24 is passed into the second exhaust gas line 44 for dioxin removal. If the temperature falls below the preset value, the exhaust gas 24 flows into the first exhaust gas line 42. The threshold value is set in this case at approximately 250° C.

I claim:

1. A sintering plant, comprising:
    an inlet location and an outlet location for sinter material;
    a sintering section between said inlet and outlet locations defining at least one first zone in which the sinter material heats to a low temperature and a second zone in which the sinter material heats to a high temperature;
    an apparatus for transporting the sinter material along said sintering section through said at least one first zone and said second zone;
    a number of discharge lines for exhaust gas disposed along said sintering section; and
    at least one dioxin catalytic converter disposed in at least one of said discharge lines along said second zone for decreasing dioxins in the exhaust gas.

2. The sintering plant according to claim 1, including a first exhaust gas line and a second exhaust gas line, at least one of said discharge lines along said at least one first zone opening into said first exhaust gas line, at least one of said discharge lines along said second zone opening into said second exhaust gas line, and said at least one dioxin catalytic converter disposed in said second exhaust gas line.

3. The sintering plant according to claim 2, wherein said second exhaust gas line is brought together with said first exhaust gas line downstream of said at least one dioxin catalytic converter in flow direction of the exhaust gas.

4. The sintering plant according to claim 2, including an adsorber disposed in said first exhaust gas line for removing dioxins from the exhaust gas.

5. The sintering plant according to claim 2, including an adsorber disposed in at least one of said discharge lines along said first zone for removing dioxins from the exhaust gas.

6. A sintering plant, comprising:
    an inlet location and an outlet location for sinter material;
    a sintering section between said inlet and outlet locations defining at least one first zone in which the sinter material heats to a low temperature and a second zone in which the sinter material heats to a high temperature;
    an apparatus for transporting the sinter material along said sintering section through said at least one first zone and said second zone;
    a number of discharge lines for exhaust gas disposed along said sintering section;
    at least one dioxin catalytic converter associated with at least one of said discharge lines of said second zone for decreasing dioxins in the exhaust gas; and
    a first exhaust gas line, a second exhaust gas line, and a branch connected between a multiplicity of said number of discharge lines and said first exhaust gas line and second exhaust gas line, said branch having a device for controlling conduction of the exhaust gas into one of said first exhaust gas line and second exhaust gas line, said at least one dioxin catalytic converter disposed in said second exhaust gas line.

7. The sintering plant according to claim 6, wherein said control device is a control valve.

8. The sintering plant according to claim 6, wherein said second exhaust gas line is brought together with said first exhaust gas line downstream of said at least one dioxin catalytic converter in flow direction of the exhaust gas.

9. The sintering plant according to claim 6, including an adsorber disposed in said first exhaust gas line for removing dioxins from the exhaust gas.

10. The sintering plant according to claim 6, including an adsorber disposed in at least one of said discharge lines along said first zone for removing dioxins from the exhaust gas.

* * * * *